3,738,978
PROCESS FOR THE MANUFACTURE OF PEPTIDES
Georg Jager, Raunheim (Main), and Rolf Geiger, Frankfurt am Main, Germany, assignors to Farbwerke Hoechst Aktiengesellschaft vormals Meister Lucius & Bruning, Frankfurt am Main, Germany
No Drawing. Filed Mar. 17, 1971, Ser. No. 125,419
Claims priority, application Germany, Apr. 8, 1970, P 20 16 703.7; Feb. 4, 1971, P 21 05 150.3
Int. Cl. C07c 103/52; C07g 7/00
U.S. Cl. 260—112.5                       4 Claims

ABSTRACT OF THE DISCLOSURE

Method of making an N-isobornyloxycarbonyl derivative of an amino acid, imino acid, or peptide by reaction thereof with isobornyloxycarbonyl chloride or with an active isobornyloxycarbonyl ester.

Improved method of synthesizing a peptide by reaction of an N-isobornyloxycarbonyl-amino or -imino acid or peptide having a free carboxy group with an amino or imino acid or peptide having a free amino group.

Improved method of synthesizing a peptide by reaction of the free amino group of $N^G$-di-isobornyloxycarbonyl-arginine, or of a peptide containing $N^G$-di-isobornyloxycarbonyl-arginine with an amino or imino acid or peptide having a free carboxy group.

---

The present invention relates to a process for the manufacture of peptides, wherein either (a) a peptide or a derivative thereof having at least one free amino group is reacted with isobornyloxycarbonyl chloride in the presence of an acid-binding agent at a pH-value between 6 and 14 or with an isobornyloxycarbonyl active ester, or (b) a N-isobornyloxycarbonyl-amino acid of a N-isobornyloxycarbonyl peptide not containing free amino groups is reacted according to the condensation methods usual in peptide chemistry with an amino-acid, the amino group of which is free and the carboxyl group of which is blocked by salt formation or by a protective group, or with a peptide containing a free amino group, or (c) a $N^G$-di-isobornyloxycarbonyl-arginine derivative, the α-amino group of which is free and whose carboxyl group may be free, protected or peptide-like bound, is reacted according to the condensation methods usual in peptide chemistry with an amino-acid or with a peptide having a free carboxyl group, and if desired, splitting off the isobornyloxycarbonyl groups by treatment with a strong acid.

The isobornyloxycarbonyl protective group, which belongs to the urethane type, and is used in the process of the invention, can be separated smoothly, which is surprising, with acids such as tri-fluoro-acetic acid or hydrogen chloride in glacial acetic acid under mild conditions, despite the fact that it is derived from a secondary alcohol.

The protective groups for amino- or imino functions of amino-acids mostly used up to now likewise belong to the urethane type, but in many cases, especially if they are derived from a primary or secondary alcohol, such as the carbobenzoxy-, p - phenylazocarbobenzoxy-, diisopropylmethoxycarbonyl-, cyclopentyloxycarbonyl-, cyclohexyloxycarbonyl-, 2-methyl-cyclohexyloxycarbonyl group, they can be split off only under more severe conditions with very strong acids such as hydrobromic acid, an additional heating being in general required (cf. E. Schröder and K. Lübke, "The Peptides," New York and London, vol. I, 1965, pp. 22 to 41, as well as K. Blaha and J. Rudinger, Collection Czechoslov. Chem. Commun., vol. 30, 1965, pp. 599 to 604). Although the p-methoxycarbobenzoxy-, tert. - butyloxycarbonyl -, tert.-amyloxycarbonyl- and 1-adamantyloxycarbonyl-groups can be separated with weaker acids such as trifluoro-acetic acid, their introduction into amino-acids is impeded by the fact that their chlorides are unstable at room temperature (cf. Experientia, vol. 25, 1969, pages 576 to 578, as well as Bulletin Chem. Soc. Japan, vol. 42, 1969, pp. 809 to 811) so that in general the azides or active esters are used, which are difficult to obtain, 1-adamantyloxy-carbonyl chloride is somewhat stable, but can be reacted with many amino acids only in very poor yields (cf. J. Amer. Chem. Soc., vol. 88, 1966, pp. 1988 to 1992), and in addition 1-adamantanol, serving as starting material, is relatively difficult to obtain. With the p - methoxy-carbobenzoxy group, instability towards, catalytic hydrogenation is disturbing, so that a selective splitting-off of the carbobenzoxy group, which is easily removable by means of catalytically excited hydrogen, is not possible. Furthermore, the tert.-butyloxycarbonyl-azide used for the introduction of the tert.-butyloxycarbonyl group, is physiologically dangerous.

The new amino or imino protective group does not have the above-mentioned disadvantages, because it can be introduced with very high yields by means of the easily accessible isobornyloxycarbonyl chloride, which is very stable at room temperature. It is also stable towards catalytic hydrogenation and can be easily split-off at room temperatuure with trifluoro-acetic acid or hydrogen chloride.

In the synthesis of arginine-containing peptides, the guanidino function is often blocked by protonation or by nitro, tosyl, benzyloxycarbonyl or tert.-butyloxycarbonyl groups (cf. Z. Chemie 8 (1968), p. 107). However, these protective groups have a series of disadvantages. Peptides which contain protonized arginine often have unfavorable properties with regard to their solubility which impede the separation of starting products and side products, and, in addition, no active esters can be isolated from N-acyl-arginine derivatives with protonized guanidine groups.

With $N^G$-nitro-arginine peptides the separation of the nitro groups, which is difficult, often leads to byproducts. During the preparation of the peptides, lactam formation occurs to a varying extent between the carboxyl group and the nitro-guanidino group. Lactam formation is also observed with $N^G$-tosyl-arginine.

The undesired formation of lactam also takes place with $N^G$-Boc-arginine, for example, in the manufacture of active esters with di-cyclohexylcarbodimide, because only one Boc-group enters into the guanidino group. The basicity still present also impedes the purification of the $N^G$-Boc-arginine peptides (Z. Chemie 8 (1968), p. 107).

Only with $N^α$, $N^G$-di-carbobenzoxy-arginine no lactam formation occurs; the yield, however, in the preparation of Z—Arg(Z)$_2$—OH is only 32% (Chem. Ber. 100 (1967), p. 160). Furthermore, a selective splitting-off of the $N^α$-benzyloxycarbonyl group with conservation of the $N^G$-protective group, which is required for the further linkage of amino acids and peptides, is impossible.

The isobornyloxycarbonyl group (Ibc), can also be used with great advantage as a guanidino-protective group for arginine in arginine-containing peptides according to (c). Two Ibc-groups enter with a high yield into the guanidino group, whereby the latter is blocked completely and its basicity is neutralized. Isoborneol is available as a very cheap product that can be obtained on a large technical scale.

A further advantage of method (c) is that the α-amino group can be protected by other protective groups which can be split-off selectively, so that a further linkage of other amino acids or peptides is possible at the carboxyl as well as at the amino terminal groups.

Isobornyloxycarbonyl peptides are prepared by the reaction of peptides or of their derivatives, which contain at least one or several free amino or imino groups, with the very stable isobornyloxycarbonyl chloride, which is added either before or during the course of the acylation. The reaction is carried out in the presence of an acid-binding agent such as alkali metal or alkaline earth metal hydroxides, carbonates, acetates, amides, alcoholates or of tert.organic amines, whereby one free carboxylic group is bound in the form of a salt and the hydrochloric acid set free is likewise bound. There are used, for example, sodium hydroxide, potassium hydroxide, lithium hydroxide, or barium hydroxide; sodium or potassium carbonate, amide, or acetate; and tertiary amines such as triethylamine, tripropyl-amine, tributyl-amine, N-methylmorpholine or N-ethylmorpholine. The operation is carried out at $-15°$ C. up to $+50°$ C., preferably at $0°$ to $25°$ C. and at a pH-value of 6 to 14, preferably at pH 8 to pH 10. A recemic or optically active isobornyloxycarbonyl chloride (D- or L-form) may be used; the chlorides are easy to obtain from D,L-isoborneol or D- and L-isoborneol (cf. J. Chem. Soc. (London), vol. 91, 1907, pp. 1973 to 1981 as well as J. Chem. Soc., volume 127, 1925, pp. 1478 to 1479) with phosgene in a manner known per se.

The new protective group can also be introduced with the aid of a D,L-, D- or L-isobornyloxycarbonyl active ester such as 2,4,5-trichlorophenyl- or N-hydroxy-succinimide ester. The operation is carried out under the same conditions as that with isobornyloxycarbonyl chloride, with the exception that the presence of strong lyes is not necessary, or even unsuitable because of a hydrolysis of the active ester. It is suitable, however, to add equimolar amounts of a tertiary organic amine.

The required isobornyloxycarbonyl active esters are easily accessible, for example from isobornyloxycarbonyl chloride and an activating component such as trichlorophenol or N-hydroxy-succinimide.

For introducing the protective group, water, dioxane, tetrahydrofurane, ether, dimethylformamide, dimethylacetamide, pyridine and other solvents commonly used in peptide chemistry, alone or in admixture with one another, may be used as solvents.

The peptides prepared according to the present invention may contain isobronyloxycarbonyl amino acids derived from all $\alpha$- or $\omega$-amino or -imino acids, in their L-, D-, or racemic form, found in naturally-occurring peptides or obtained by synthesis, for example; neutral N-$\alpha$-isobornyloxycarbonyl-amino acids such as N-$\alpha$-isobornyloxycarbonyl-glycine, -alanine, -valine, -norvaline, leucine, -isoleucine, -norleucine, -amino-butyric acid, -isovaline, -aminocyclohexane carboxylic acid, -phenylalanine, -C-phenylglycine, -asparagine, -glutamine, -methionine, and diisobornyloxycarbonyl-cystine. The peptides may further contain N$^\omega$-isobornyloxycarbonyl- amino acids such as, for example, N-isobornyloxycarbonyl-$\beta$-alanine, -$\gamma$-aminobutyric acid, and -$\epsilon$-aminocaproic acid. Furthermore, there may be used N$^\alpha$-isobornyloxycarbonyl-amino acids having functional groups in the lateral chains, which groups may be protected, for example: N$^\alpha$-isobornyloxycarbonyl-serine, N$^\alpha$-isobornyloxycarbonyl-O-tert.-butyl-serine, N$^\alpha$ - isobornyloxycarbonyl-threonine, N$^\alpha$-isobornyloxycarbonyl-tyrosine, N$^\alpha$ - isobornyloxycarbonyl-O-tert.-butyl - tyrosine, N$^\alpha$ - isobornyloxycarbonyl-dihydroxyphenylalanine, N$^\alpha$ - isobornyloxycarbonyl-S-benzyl - cysteine, N$^\alpha$ - isobornyloxycarbonyl-tryptophane, and N$^\alpha$ - N$^{im}$ - diisobornyloxy - carbonyl-histidine. Other suitable compounds are N - isobornyloxycarbonyl-diamino-acids, in which the other amino group is blocked by a second isobornyloxycarbonyl group or by another N-protective group, for example: N$^\alpha$-isobornyloxycarbonyl-N$^\epsilon$-tert.-butyloxycarbonyl - lysine, N$^\alpha$-benzyloxycarbonyl-N$^\epsilon$ - isobornyloxycarbonyl - lysine and N$^\alpha$-isobornyloxycarbonyl - N$^\epsilon$-benzyl - oxycarbonyl - ornithine. Other compounds are N - isobornyloxycarbonyl- aminodicarboxylic acids containing one free and one protected carboxyl group, such as N$^\alpha$-isobornyloxycarbonyl-glutamic acid-$\gamma$-tert. - butylester or N$^\alpha$ - isobornyloxycarbonyl-aspartic acid-$\alpha$- or $\beta$-benzyl ester. In addition to these compounds, halogen-containing N - isobornyloxycarbonyl-amino-acids such as N-isobornyloxycarbonyl-$\beta$-chloralanine, N-isobornyloxycarbonyl - p - chlorophenyl-alanine, N-isobornyloxycarbonyl - iodo - gorgo - acid and N-isobornyloxycarbonyl-thyroxin, are suitable.

Finally, peptides may also be prepared using aromatic amino-acids or amino-sulfonic acids protected by the isobornyloxycarbonyl group, for example N-isobornyloxycarbonyl-p-aminobenzoic acid or N-isobornyloxycarbonyl - p - amino - sulfonic acid as well as N-isobornyloxycarbonyl-imino acids, for example N-isobornyloxycarbonyl-proline, -hydroxy-proline, -azetidin-2-carboxylic acid, -N-methylvaline, -N-methylleucine and -N - methyl - $\beta$-alanine.

In the method of the invention described under (b) the methods usually employed in peptide chemistry are used (cf. Schröder and Lübke, The Peptides, Academic Press, New York and London, 1965 and 1966), using, as far as necessary, the common protective groups. The most important linking processes comprise the di-cyclohexyl-carbodiimide-, the active ester- and mixed anhydride methods.

As N-isobornyloxycarbonyl-peptides, all peptides in which all amino groups are blocked with the isobornyloxycarbonyl group, and in addition thereto by other protective groups, in which one carboxyl group is present in free form, and in which other functional groups in lateral chains may be protected, may be used.

These isobornyloxycarbonyl-amino acids or -peptides may be reacted with all $\alpha$- or $\omega$-amino- or imino acids in their L-, D- or racemic form, including the diamino-carboxylic acids and aminodicarboxylic acids, in which one amino group is free and the carboxyl groups are blocked by protective groups or by salt formation and other functional groups in lateral chains may be protected, which are found in naturally occurring peptides or can be obtained by synthesis. Furthermore, they may be reacted with peptides containing the aforementioned naturally-occurring or synthetic amino acids, which peptides contain a free amino group and in which other functional groups may be protected. With cystine-peptides, both amino groups may be free and may be used for condensation with Ibc-amino acids or -peptides.

Owing to the new N-protective group, the peptides of the invention have excellent properties with regard to solubility in organic solvents.

Finally, it is possible according to method (c) to react an N$^G$-di-isobornyloxycarbonyl-arginine derivative having a free $\alpha$-amino group with an amino-acid or a peptide having a free carboxyl group. The functional groups which are not required for the reaction such, for example as SH groups, are suitably protected. Other groups such, for example as OH, may remain unprotected.

As amino protective groups there may be used, for example: the benzyloxycarbonyl, tert. butyloxycarbonyl as well as the formyl, tosyl or p-methoxybenzyloxycarbonyl groups. As carboxyl protective groups, there may be used, for example: the methyl, ethyl, tert. butyl, benzyl, and 4-nitrobenzyl esters, as well as the carboxylic acid imide. The free carboxyl group (Y=OH) is converted suitably into a salt by the addition of a base such as triethylamine or N-ethylmorpholine. With higher peptides, salt formation is not required in any case.

The process according to the invention permits the preparation of peptides of any composition and size if these are not limited by the method of peptide synthesis used.

The arginine-containing peptides of the invention which still contain Ibc groups have excellent properties with regard to solubility.

According to the invention, the separation of the isobenzyloxycarbonyl protective group is effected by a treatment with acids, for which purpose, although the new protective group belongs to the urethane type derived from a secondary alcohol, surprisingly also acids weaker than a mixture of HBr/glacial acetic acid. For example, the mineral acids HCl, HF and $H_2SO_4$, may be used, if necessary in organic solvents such as glacial acetic acid, ethylacetate, dioxane, tetrahydrofurane, nitromethane, alcohols or dimethylacetamide. Also organic acids such as trifluoro-acetic acid, trichloro-acetic acid or formic acid may be used. In this case, trifluoro-acetic acid or formic acid may serve simultaneously as a solvent. The possibility of splitting off the isobornyloxycarbonyl protective group under these mild conditions with weaker acids than HBr and the resistance to catalytic hydrogenation and to bases, permits a differentiation from other protective group, for example from the benzyloxycarbonyl group which can be eliminated only with HBr. Thus it is possible, on the one hand, to split off the isobornyloxycarbonyl group selectively, for example, by means of HCl-glacial acetic acid or trifluoroacetic acid, and, on the other hand, the benzyloxycarbonyl group by catalytic hydrogenation. In addition thereto, splitting off of the new protective groups can be effected by means of acidic ion exchangers.

The products of the invention, in which the new N-protective group may still be present, may be used as therapeutic agents, for example in the same manner as long chain peptides having known therapeutic action, such as that of insulin. Short chain peptides in which the Ibc group has been split off for example the tripeptide pyroglutamyl-histidyl-proline-amide, likewise show physiological activity, for example as releasing factors for hormones. Peptides which contain o-aminobenzoic acid as a constituent are likewise therapeutic agents, for example for reducing the capacity of the blood to coagulate. These peptides contain a diazotizable amino group which is of importance in the formation of antigens or of diagnostic agents. The products of the invention may also serve for the preparation of other therapeutically valuable peptides such as oxytocin, vasopressin, glucagon, secretin, gastrin, insulin, proinsulin or ACTH. For this purpose the peptides of the invention are condensed with other peptides according to the usual condensation methods such as the method using activated esters, mixed anhydrides or carbodiimide.

The following examples illustrate the invention: In these examples the abbreviations common for the individual amino-acids and protective groups usual in peptide chemistry are used. The isobornylcarbonyl group in its racemic form has been given the abbreviation Ibc, for the D-form of this group the abbreviation D-Ibc and for the L-form the abbreviation L-Ibc have been introduced.

Further abbreviations:

OSu=N-hydroxy-succinimide ester
OPCP=pentachlorophenyl ester
Bz=benzyl
OtBu=tert.-butyl ester
Z=benzyloxycarbonyl
Ibc=isobornyloxycarbonyl
tBu=tert.-butyl
Mbh=4,4′-dimethoxy-benzhydryl
Boc=tert.-butyloxycarbonyl The following examples illustrate the invention:

EXAMPLE 1

Ibc-Pro-Gln-Ala-OH

A solution of 2.15 g. (5 mmoles) of H-Pro-Gln-Ala-OH·$CF_3COOH$ in 3 cc. of water and 1 cc. of dimethylacetamide was combined with 1.25 cc. (6 mmoles) of Ibc-Cl. Then, 4 N-sodium hydroxide solution was added dropwise at room temperature, while stirring, and maintaining the pH value constantly at 10. Afted the addition of 4 cc. of 4 N-sodium hydroxide solution, the whole was acidified with citric acid, extracted with ethyl acetate and the ethyl acetate solution was washed with water, dried over sodium sulfate and evaporated under reduced pressure. The residue was triturated with ether. Yield: 1.75 g. (71%); melting point: 83° C. (decomposition); $[\alpha]_D^{22}$: −50.4° (c.=1, in chloroform).

$C_{24}H_{38}N_4O_7$ (494.6).—Calc. (percent): C, 58.3; H, 7.7; N, 11.4. Found (percent): C, 58.3; H, 7.9; N, 11.1.

EXAMPLE 2

Ibc-Pro-Leu-Gly-$NH_2$ ($\alpha$) A solution of 1.62 g. (5.5 mmoles) of Ibc-OSu and 1.47 g. (5 mmoles) of H-Pro-Leu-Gly-$NH_2$·½ $H_2O$ in 20 cc. of dimethylformamide was evaporated under a high vacuum after having been stirred for 3 hours at room temperature. The syrup-like residue was triturated with water, whereupon it crystallized.

Yield: 2.31 g. (quantitative); melting point 117–119° C.; $[\alpha]_D^{22}$: −66.6° (c.=1, in chloroform).

$C_{24}H_{40}N_4O_5$ (464.6).—Calc. (percent): C, 62.1; H, 8.6; N, 12.0. Found (percent): C, 61.8; H, 8.6; N, 12.0.

($\beta$) 1.47 g. (5 mmoles) of H-Pro-Leu-Gly-$NH_2$·½$H_2O$ were suspended in 1 cc. of water and 1 cc. of dimethylacetamide. After addition of 1.25 cc. (6 mmoles) of Ibc-Cl, 12.5 cc. of 5 N-sodium hydroxide solution were added dropwise, while stirring, at room temperature and at pH 12, and then the whole was combined with 6 cc. of dimethylacetamide and finally acidified with a 0.5 m. solution of citric acid. The oil that precipitated was dissolved in ethyl acetate and the ethyl acetate solution was washed with water, dried over sodium sulfate and evaporated under reduced pressure. The amorphous residue crystallized upon trituration with water.

Yield: 1.65 g. (71%); melting point: 118–120° C.; $[\alpha]_D^{22}$: −67.1° (c.=1, in chloroform). Chromatography of the product showed that it was identical with the product obtained according to ($\alpha$).

EXAMPLE 3

H-Pro-Leu-Gly-$NH_2$·$CF_3COOH$ 1.00 g. (2.15 mmoles) of Ibc-Pro-Leu-Gly-$NH_2$ were dissolved in 4 cc. of trifluoroacetic acid. After allowing the whole to stand for 1 hour at room temperature, the solution was concentrated in the cold to yield an oil, which was then triturated with 50 cc. of absolute ether. The crystals that separated were isolated by decantation, treated again wtih 50 cc. of fresh absolute ether and then dried over KOH and $P_2O_5$ under a high vacuum.

Yield: 0.855 g. (quantitative); decomposition at 95–100° C. According to thin-layer chromatography, the substance was found to be identical wtih H-Pro-Leu-Gly-$NH_2$·$CF_3COOH$ ($R_f$=0.21, in chloroform/methanol 8:3, silica gel plate of Messrs. Merck).

EXAMPLE 4

Ibc-Phe-Pro-Leu-Gly-$NH_2$ 4.32 g. (10 mmoles) of H-Phe-Pro-Leu-Gly-$NH_2$ and 3.24 g. (11 mmoles) of Ibc-OSu were stirred for 4 hours in 20 cc. of dimethylformamide. After evaporation under a high vacuum, the residue was triturated in ether/petroleum ether.

Yield: 5.34 g. (87%); melting point: 112–115° C. (decomposition); $[\alpha]_D^{22}$: −36.6° (c.=1, in chloroform).

$C_{33}H_{49}N_5O_6$ (611.8).—Calc. (percent): C, 64.7; H, 8.1; N, 11.5. Found (percent): C, 64.4; H, 8.1; N, 11.7.

EXAMPLE 5

H-Phe-Pro-Leu-Gly-$NH_2$·$CF_3COOH$ 0.6 g. (1 mmole) of Ibc-Phe-Pro-Leu-Gly-$NH_2$ were dissolved in 3 cc. of trifluoroacetic acid. After allowing the whole to stand for 1 hour at room temperature, the solution was concentrated under reduced pressure in the cold and the residue was triturated with absolute ethanol. The crystals that formed were separated by filtration with suction, were washed with absolute ether and dried over KOH and $P_2O_5$ under a high vacuum.

Yield: 0.51 g. (93%); melting point: 102–105° C. (decomposition). In thin-layer chromatography, the product was found to be identical with H-Phe-Pro-Leu-Gly-$NH_2 \cdot CF_3COOH$.

EXAMPLE 6

H-Phe-Pro-Leu-Gly-$NH_2 \cdot HCl$

A solution of 1.22 g. (2 mmoles) of Ibc-Phe-Pro-Leu-Gly-$NH_2$ in 10 cc. of HCl/glacial acetic acid was combined with 100 cc. of absolute ether after standing for 2 hours at room temperature. The crystals formed were filtered off, washed with absolute ether and dried over KOH and $P_2O_5$.

Yield: 0.76 g. (81%). According to chromatographic analysis, the product was found to be identical with H-Phe-Pro-Leu-Gly-$NH_2$.

EXAMPLE 7

(Ibc)$_3$-Insulin 120 mg. (0.02 mmole) of bovine insulin were stirred for 24 hours with 53 mg. (0.18 mmole) of Ibc-OSu in 1 cc. of dimethylacetamide. The solution was then combined with ether. After trituration, the precipitate formed was decanted and the residue was treated twice with ether.

Yield: 135 mg. After a treatment with trifluoro-acetic acid, insulin was set free, as was proved by an electrophorogram.

EXAMPLE 8

(a) Ibc-Gly-OSu 10.2 g. (40 mmoles) of Ibc-Gly-OH and 5.53 (48 mmoles) of N-hydroxy-succinimide in 80 cc. of ethyl acetate were combined at 0° C. with 8.72 g. (40 mmoles) of dicyclohexylcarbodiimide. After allowing the whole to stand for 12 hours at 0° C. and for 1 hour at room temperature, urea was removed by filtration with suction and the filtrate was evaporated under reduced pressure. The residue was treated with methanol.

Yield: 10.5 g. (75%); decomposition at about 100° C.

$C_{17}H_{24}N_2O_6$ (352.4).—Calc. (percent): N, 8.0. Found (percent): N, 8.2.

(b) Ibc-Gly-Pro-Leu-Gly-$NH_2$

A solution of 1.47 g. (5 mmoles) of H-Pro-Leu-Gly-$NH_2 \cdot \frac{1}{2}H_2O$ and 1.76 g. (5 mmoles) of Ibc-Gly-OSu was stirred in 10 cc. of dimethylformamide for 3 hours, then concentrated under a high vacuum. The resulting residue was then triturated with diluted aqueous citric acid. After decantation, the oily residue was dried over $P_2O_5$ and dissolved in ethyl acetate. The product was precipitated with the aid of petroleum ether, filtered off with suction and dried.

Yield: 2.27 g. (87%); melting point: 84–87° C. (decomposition); $[\alpha]_D^{22}$: −46.8° (c.=1, in chloroform).

$C_{26}H_{43}N_5O_6 \cdot H_2O$ (523.7).—Calc. (percent): C, 59.7; H, 8.7; N, 13.4. Found (percent): C, 59.7; H, 8.7; N, 13.0.

(c) H-Gly-Pro-Leu-Gly-$NH_2 \cdot CF_3COOH$ 1.05 g. (2 mmoles) of Ibc-Gly-Pro-Leu-Gly-$NH_2 \cdot H_2O$ were dissolved in 2 cc. of trifluoroacetic acid. After allowing the whole to stand for 1 hour at room temperature, the solution was concentrated under reduced pressure to yield an oil, which was triturated with absolute ether, filtered off with suction, washed with absolute ether and dried over KOH and $P_2O_5$.

Yield: 0.83 g. (91%); melting point: 83–84° (decomposition); $[\alpha]_D^{22}$: −67.5° (c.=1, in methanol).

EXAMPLE 9

(a) Ibc-Ala-OPCP 2.69 g. (10 mmoles) of Ibc-Ala-OH and 2.93 g. (11 mmoles) of pentachlorophenol in 10 cc. of ethyl acetate were combined at 0° C. with 2.06 g. (10 mmoles) of dicyclohexyl-carbodiimide. After allowing the whole to stand for 12 hours at 0° C., urea was filtered off with suction. The filtrate was washed with ethyl acetate and evaporated under reduced pressure.

Yield: 5.08 g. (95%); $[\alpha]_D^{22}$: −10.1° (c.=1, in chloroform).

$C_{20}H_{22}NO_4Cl_5$ (533.7).—Calc. (percent): C, 45.0; H, 4.2; N, 2.6; Cl, 33.2. Found (percent): C, 45.3; H, 4.2; N, 2.4; Cl, 33.5.

(b) Ibc-Ala-Pro-Leu-Gly-$NH_2$ ($\alpha$) 1.12 g. (2.2 mmoles) of Ibc-Ala-OPCP and 0.57 g. (2 mmoles) of H-Pro-Leu-Gly-$NH_2 \cdot \frac{1}{2}H_2O$ were dissolved in 20 cc. of dimethylformamide. After allowing the whole to stand for 12 hours at room temperature, the solution was evaporated under a high vacuum, the residue was triturated with ethyl acetate, filtered off with suction and triturated with a mixture of ether and petroleum ether.

Yield: 0.92 g. (84%); melting point: 91–94° C. (decomposition); $[\alpha]_D^{22}$: −49.3° (c.=1, in chloroform).

$C_{27}H_{45}N_5O_6 \cdot \frac{1}{2}H_2O$ (544.7).—Calc. (percent): C, 59.6; H, 8.5; N, 12.9. Found (percent): C, 59.8; H, 8.7; N, 12.6.

($\beta$) A solution of 1.35 g. (5 mmoles) of Ibc-Ala-OH and 0.7 cc. (5 mmoles) of triethylamine in 20 cc. of tetrahydrofuran was combined, while stirring, at 0° C., with 0.48 cc. (5 mmoles) of ethyl chloroformate. The precipitate that separated was dissolved by the addition of 20 cc. of dimethylformamide and 25 cc. of chloroform. Then, 1.47 g. (5 mmoles) of H-Pro-Leu-Gly-$NH_2 \cdot \frac{1}{2}H_2O$ dissolved in 20 cc. of dimethylformamide, were added. The whole was stirred for 1 hour, then evaporated under a high vacuum. The oily residue was dissolved in ethyl acetate. The ethyl acetate solution was washed thrice each time with a sodium bicarbonate solution, a solution of dilute citric acid and water, dried over sodium sulfate and evaporated under reduced pressure. The residue was treated with a mixture of ether and petroleum ether.

Yield: 2.08 g. (77%); melting point: 90–94° C. (decomposition). By thin-layer chromatography, the product was found to be identical with the product obtained according to ($\alpha$).

($\gamma$) A solution of 0.68 g. (2.5 mmoles) of Ibc-Ala-OH and 0.45 g. (2.75 mmoles) of 3-hydroxy-4-oxo-3,4-dihydro-1,2,3-benzotriazine in 12 cc. of dimethyl formamide was combined at 0° C. with 0.52 g. of dicyclohexyl-carbodiimide. After allowing the whole to stand for 1 hour at 0° C. and for 1 hour at room temperature, the mixture was filtered with suction and the filtrate was combined with 0.74 g. (2.5 mmoles) of H-Pro-Leu-Gly-$NH_2 \cdot \frac{1}{2}H_2O$. The mixture was allowed to react for 4 hours at room temperature, then filtered and the filtrate evaporated under a high vacuum. The residue was treated with ether.

Yield: 1.32 g. (quantitative); melting point: 95–98° C. (decomposition). By chromatography, the product was found to be identical with the products obtained according to ($\alpha$) and ($\beta$).

(c) H-Ala-Pro-Leu-Gly-$NH_2 \cdot CF_3COOH$ 0.54 g. (1 mmole) of Ibc-Ala-Pro-Leu-Gly-$NH_2 \cdot \frac{1}{2}H_2O$ was dissolved in 2 cc. of trifluoroacetic acid. The whole was allowed to stand for 1 hour, concentrated under reduced pressure to yield an oil which was then triturated with absolute ether. The trifluoroacetate was removed by suction-filtration, washed with absolute ether and dried over KOH and $P_2O_5$.

Yield: 0.47 g. (quantitative); $[\alpha]_D^{22}$: —70.9° (c.=1, in methanol). $R_f$=0.22 in a mixture of butanol, glacial acetic acid and water (3:1:1) (thin layer silica gel plate F, Merck).

EXAMPLE 10

(a) Ibc-Phe-Pro-Leu-Gly-NH₂

($\alpha$) A solution of 4.43 g. (10 mmoles) of Ibc-Phe-OSu [prepared from 3.45 g. (10 mmoles) of Ibc-Phe-OH, 1.27 g. (11 mmoles) of N-hydroxysuccinimide and 2.06 g. (10 mmoles) of dicyclohexyl-carbodiimide in 40 cc. of ethyl acetate with quantitative yield] and 2.64 g. (9 mmoles) of H-Pro-Leu-Gly-NH₂·½H₂O in 10 cc. of dimethylformamide was allowed to stand for 12 hours at room temperature and then evaporated in a high vacuum. The oily residue was dissolved in ethyl acetate. The ethyl acetate solution was washed with a sodium bicarbonate solution, dilute critic acid and water, dried over sodium sulfate and evaporated under reduced pressure. The foamy residue was triturated with a mixture of ether and petroleum ether.

Yield: 4.51 g. (82%); melting point 112–115° C. (decomposition); $[\alpha]_D^{22}$: —36.6° (c.=1, in chloroform).

$C_{33}H_{49}N_5O_6$ (611.8).—Calc. (percent): C, 64.7; H, 8.1; N, 11.4. Found (percent): C, 64.4; H, 8.1; N, 11.7.

($\beta$) 1.73 g. (5 mmoles) of Ibc-Phe-OH were dissolved in 20 cc. of tetrahydrofurane and 0.48 cc. (5 mmoles) of chloroformic acid ethyl ester and 0.7 cc. (5 mmoles) of triethylamine were added dropwise to this solution, at —10° C., while stirring. 20 cc. of dimethylformamide and 25 cc. of chloroform were added, whereupon a clear solution formed. Then, a solution of 1.50 g. (5 mmoles) of H-Pro-Leu-Gly-NH₂·½H₂O in 20 cc. of dimethylformamide was added and the whole was stirred for 1 hour at room temperature. After evaporation under a high vacuum, the oily residue was dissolved in ethyl acetate and working up was effected as described under ($\alpha$).

Yield: 2.36 g. (77%); $[\alpha]_D^{22}$: —34.6° (c=1, in chloroform). By thin-layer chromatography, the product was found to be identical with the product obtained according to ($\alpha$).

(b) H-Phe-Pro-Leu-Gly-NH₂·HCl

A solution of 1.22 g. (2 mmoles) of Ibc-Phe-Pro-Leu-Gly-NH₂ in 10 cc. of 1 N-HCl in glacial acetic acid was allowed to stand for 3 hours at room temperature and then combined with 100 cc. of absolute ether. The mixture was allowed to stand for several hours and, after trituration, rapidly filtered with suction, washed with absolute ether and dried over KOH and P₂O₅. Yield: 0.76 g. (81%); decomposition at 127–130° C.

$C_{22}H_{34}N_5O_4Cl$ (468.0).—Calc. (percent): Cl, 7.6. Found (percent): Cl, 7.3.

(c) H-Phe-Pro-Leu-Gly-NH₂·CF₃COOH 0.61 g. (1 mmole) of Ibc-Phe-Pro-Leu-Gly-NH₂ was dissolved in 3 cc. of trifluoroacetic acid. The solution was allowed to stand for 1 hour at room temperature and then evaporated under reduced pressure to give an oil, which was triturated with absolute ether, filtered with suction, washed with absolute ether and dried in a high vacuum over P₂O₅ and KOH.

Yield: 0.53 g. (97%); decomposition at 102–105° C. $R_f$=b 0.31 in chloroform/methanol (8:3) (thin layer plate silica gel F, Merck).

(d) L-Ibc-Try-Phe-Pro-Leu-Gly-NH₂

0.31 g. (0.8 mmole) of L-Ibc-Try-OH, 0.38 g. (0.8 mmole) of H-Phe-Pro-Leu-Gly-NH₂·HCl and 0.22 g. (1.6 mmoles) of 1-hydroxybenzotriazole were dissolved in 3 cc. of dimethylformamide. After addition of 0.11 cc. (0.8 mmole) of triethylamine and 0.165 g. (0.8 mmole) of dicyclohexyl-carbodiimide at 0° C., the whole was allowed to stand for 1 hour at 0° C. and for 1 hour at room temperature. It was then filtered, the filtrate was evaporated under a high vacuum and the syrupy residue was dissolved in ethyl acetate. The filtered ethyl acetate solution was washed with a sodium bi-carbonate solution, dilute citric acid and water, dried over sodium sulfate and evaporated under reduced pressure. The residue was dissolved in hot ethyl acetate, filtered and the product was precipitated in crystalline form with the aid of petroleum ether.

Yield: 0.53 g. (83%); decomposition at 150–155° C. $C_{44}H_{59}N_7O_7$ (798.0).—Calc. (percent): C, 66.2; H, 7.5; N, 12.3. Found (percent): C, 66.2; H, 7.6; N, 12.5.

(e) H-Try-Phe-Pro-Leu-Gly-NH₂·CF₃COOH

A solution of 0.17 g. (0.213 mmole) of L-Ibc-Try-Phe-Pro-Leu-Gly-NH₂ in 1 cc. of trifluoroacetic acid was allowed to stand for 1 hour at room temperature and then combined with 30 cc. of absolute ether. After trituration, crystals were isolated by suction-filtration, washed with absolute ether and dried over KOH and P₂O₅ in a high vacuum.

Yield: 0.16 g. (quantitative); $[\alpha]_D^{22}$: —37.9° (c.=1, in methanol); $R_f$=0.58 in butanol/glacial acetic acid/water (3:1:1) (thin-layer plate silica gel F, Merck).

EXAMPLE 11

(a) Ibc-Cys(Bzl)-Pro-Leu-Gly-NH₂

1.96 g. (5 mmoles) of Ibc-Cys-(Bzl)-OH, 1.47 g. (5 mmoles) of H-Pro-Leu-Gly-NH₂·½H₂O and 1.35 g. (10 mmoles) of 1-hydroxy benzotriazole in 30 cc. of dimethylformamide were combined, at 0° C., with 1.03 g. (5 mmoles) of dicyclohexyl-carbodiimide. After standing for 1 hour at 0° C. and for 1 hour at room temperature, the urea that precipitated was removed by suction-filtration. The filtrate was evaporated under a strongly reduced pressure and the residue was dissolved in ethyl acetate. The ethyl acetate solution was washed with a sodium bi-carbonate solution, dilute citric acid and water, dried over sodium sulfate and evaporated under reduced pressure. The residue was triturated with a mixture of ether and petroleum ether.

Yield: 2.66 g. (81%); melting point: 86–90° C. (decomposition); $[\alpha]_D^{22}$: —37.4° (c.=1, in chloroform).

$C_{34}H_{51}N_5O_6S$ (657.9).—Calc. (percent): C, 62.1; H, 7.8; N, 10.6; S, 4.9. Found (percent): C, 61.8; H, 7.7; N, 10.6; S, 4.9.

(b) H-Cys(Bzl)-Pro-Leu-Gly-NH₂·CF₃COOH

A solution of 0.66 g. (1 mmole) of Ibc-Cys(Bzl)-Pro-Leu-Gly-NH₂ in 2 cc. of trifluoroacetic acid was allowed to stand for 1 hour at room temperature and then concentrated under reduced pressure. The oil formed was triturated with 50 cc. of absolute ether. The resulting crystals were isolated by suction-filtration, washed with absolute ether and dried over KOH.

Yield: 0.55 g. (88%); $[\alpha]_D^{22}$: —57.1° (c.=1, in methanol); $R_f$=0.36 in butanol/glacial acetic acid/water (3:1:1) (thin-layer plate silica gel F, Merck).

EXAMPLE 12

(a)

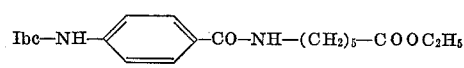

A solution of 15.9 g. (50 mmoles) of Ibc-p-aminobenzoic acid, 8.0 g. (50 mmoles) of ε-aminocaproic acid ethyl ester (J. Amer. Chem. Soc., volume 68 (1946), page 1648) and 13.5 g. (100 mmoles) of 1-hydroxy-benzo-triazole in 120 cc. of dimethylformamide was combined at 0° C. with 10.3 g. (50 mmoles) of dicyclohexyl-carbodiimide. After standing for 1 hour at 0° C. and for 1 hour at room temperature, the whole was filtered and the filtrate was evaporated under a highly reduced pressure. The oily residue was dissolved in ethyl acetate and the filtered ethyl acetate solution was washed with a sodium bicarbonate solution, dilute citric acid and a sodium chloride solution, dried over sodium sulfate and evaporated under reduced pressure. The crystalline residue was dissolved in hot ethyl acetate and the product was precipitated by addition of petroleum ether.

Yield: 17.7 g. (77%); melting point: 126–128° C.
$C_{26}H_{38}N_2O_5$ (458.6).—Calc. (percent): C, 68.1; H, 8.3; N, 6.1. Found (percent): C, 68.1; H, 8.3; N, 6.4.

(b) 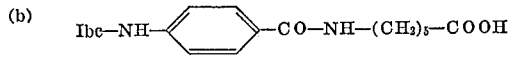

A solution of 9.17 g. (20 mmoles) of the ethyl ester obtained according to (a) in 100 cc. of dioxane was combined with 25 cc. of 1 N-sodium hydroxide solution and the whole was stirred for 20 hours at room temperature. After acidification with citric acid, the syrup that precipitated was dissolved in ethyl acetate. The ethyl acetate solution was washed with water, dried over sodium sulfate and evaporated under reduced pressure. The crystalline residue was dissolved in ethyl acetate, filtered and precipitation was effected with the aid of petroleum ether.

Yield: 8.22 g. (95%); melting point: 187–188° C. (decomposition).
$C_{24}N_{34}N_2O_5$ (430.6).—Calc. (percent): C, 67.0; H, 8.0; N, 6.5. Found (percent): C, 67.3; H, 8.2; N, 6.7.

EXAMPLE 13

(a) D-Ibc-Gln-Ala-Gln-AsN-Pro-Gln-Ala-OH

A solution of 0.42 g. (1.3 mmoles) of D-Ibc.Gln-OH and 0.17 g. (1.5 mmoles) of N-hydroxysuccinimide in 5 cc. of ethyl acetate was combined at 0° C. with 0.27 g. (1.3 mmoles) of dicyclohexyl-carbodiimide. After allowing the whole to stand for 20 hours at 0° C., urea was removed by suction-filtration and the filtrate was evaporated under reduced pressure to yield a syrup which was then shortly dried in a high vacuum.

The syrup was dissolved together with 0.75 g. (1 mmole) of H-Ala-Gln-AsN-Pro-Gln-OH.$CF_3$COOH (according to German patent application P 19 24 802.3) in 5 cc. of dimethylformamide. After addition of 0.28 cc. (2 mmoles) of triethylamine at 0° C., the mixture was stirred for 12 hours at room temperature and the solution was then evaporated under a strongly reduced pressure. The syrup-like residue was triturated with 50 cc. of ether, the crystallized product was filtered off with suction, dissolved in a mixture of methanol and water and the solution was stirred for 30 minutes with Dowex 50 (H-form).

The ion exchanger was removed by filtration, the filtrate was washed with methanol and evaporated under reduced pressure. The residue was triturated twice with hot ethyl acetate.

Yield: 0.89 g. (91%); decomposition at 140–145° C.
$C_{41}H_{65}N_{11}O_{14}.2½H_2O$ (981.1).—Calc. (percent): C, 50.2; H, 7.2; N, 15.7. Found (percent): C, 49.9; H, 7.0; N, 15.6.

(b) H-Gln-Ala-Gln-AsN-Pro-Gln-Ala-OH·$CF_3$COOH 0.75 g. (0.765 mmole) of D-Ibc-Gln-Ala-Gln-AsN-Pro-Gln-Ala-OH.2½$H_2O$ was dissolved in 2 cc. of trifluoroacetic acid. After standing for 1 hour at room temperature, the mixture was triturated with 50 cc. of absolute ether. The crystals formed were isolated by suction-filtration, washed with absolute ether and dried under a strongly reduced pressure over KOH and $P_2O_5$.

Yield: 0.66 g. (95%); decomposition at 130–135° C.; $[\alpha]_D^{22}$: −62.1° (c.=1, in methanol).

EXAMPLE 14

(a) Ibc-Gln-OPCP 1.63 g. (5 mmoles) of Ibc-Gln-OH and 1.47 g. (5.5 mmoles) of pentachlorophenol in 10 cc. of ethyl acetate were combined, at 0° C., with 1.03 g. (5 mmoles) of dicyclohexyl-carbodiimide. After allowing the whole to stand for 12 hours at 0° C. and for 1 hour at room temperature, urea was removed by suction-filtration. The filtrate was washed with ethyl acetate and then evaporated under reduced pressure. The residue was treated with a mixture of ether and petroleum ether.

Yield: 2.55 g. (89%); melting point: 78–80° C.; $[\alpha]_D^{22}$: −9.4° (c.=1, in chloroform).
$C_{22}H_{25}N_2O_5Cl_5$ (574.8).—Calc. (percent): C, 46.0; H, 4.4; N, 4.9; Cl, 30.8. Found (percent): C, 46.4; H, 4.6; N, 4.7; Cl, 30.5.

(b) Ibc-Gln-Ala-Gln-AsN-Pro-Gln-Ala-OH

A solution of 0.63 g. (1.1 mmoles) of Ibc-Gln-OPCP and 0.75 g. (1 mmole) of H-Ala-Gln-AsN-Pro-Gln-Ala-OH.$CF_3$COOH (according to German patent application P 19 24 802.3) in 8 cc. of dimethylformamide was combined at 0° C. with 0.28 cc. of triethylamine. After having stirred for 24 hours at room temperature, the mixture was filtered with suction and the filtrate was evaporated in a high vacuum. The oily residue was triturated with hot ethyl acetate.

Yield: 0.78 g. (80%); melting point: 190–192° C. (decomposition); $[\alpha]_D^{22}$: −64.0° (c.=1, in 90% acetic acid). By chromatography, the product was found to be identical with the product obtained according to Example 13(a).

EXAMPLE 15

(a) Z-Lys(Ibc)-Ala-Gln-AsN-Pro-Gln-Ala-OH

A solution of 2.07 g. (4.5 mmoles) of Z-Lys(Ibc)-OH (obtained from Z-Lys-OH in the same manner as Z-Lys(D-Ibc)-OH in quantitative yield, $[\alpha]_D^{22}$: +12.8° (c.=1, in chloroform)), and 0.73 g. (4.5 mmoles) of 3-hydroxy-4-oxo-3,4-dihydro-1,2,3-benzotriazine in 15 cc. of dimethylformamide was combined at 0° C. with 0.93 g. (4.5 mmoles) of dicyclohexylcarbodiimide. The whole was allowed to stand for 1 hour at 0° C. and for 1 hour at room temperature, urea was filtered off with suction and the filtrate was combined with a solution of 2.25 g. (3 mmoles) of H-Ala-Gln-AsN-Pro-Gln-Ala-OH.$CF_3$COOH in 15 cc. of dimethylformamide. After addition of 0.83 cc. (6 mmoles) of triethylamine at 0° C. and stirring for 2 hours at room temperature, the solution was evaporated under a highly reduced pressure. The residue was triturated with a mixture of ethyl acetate and ether, filtered off with suction, and dissolved in a mixture of methanol and water. The solution was stirred for 20 minutes at 10° C. with Dowex 50 (H-form). The ion exchanger was then removed by suction-filtration, the filtrate was washed with methanol and evaporated under reduced pressure. The dried residue was boiled with isopropanol.

Yield: 2.55 g. (79%); melting point: 208–210° C. (decomposition); $[\alpha]_D^{22}$: −23.9° (c.=1, in 90% acetic acid).
$C_{50}H_{75}N_{11}O_{15}$ (1070.2).—Calc. (percent): C, 56.1; H, 7.1; N, 14.4. Found (percent): C, 56.1; H, 7.1; N, 14.1.

(b) H-Lys(Ibc)-Ala-Gln-AsN-Pro-Gln-Ala-OH 1.60 g. (1.5 mmoles) of Z-Lys(Ibc)-Ala-Gln-AsN-Pro-Gln-Ala-OH were hydrogenated for 30 minutes in a mixture of methanol and water in the presence of palladium black. After removal of the catalyst, the solution was evaporated under reduced pressure and the residue was dried over $P_2O_5$ under a highly reduced pressure.

Yield: 1.22 g. (88%). The product was found to be uniform in thin-layer chromatography ($R_f$=0.06 in butanol/glacial acetic acid/water (3:1:1) (thin-layer plate silica gel F, Merck)).

(c) Ibc-Pro-Lys(Ibc)-Ala-Gln-AsN-Pro-Gln-Ala-OH 0.62 g. (3 mmoles) of dicyclohexyl-carbodiimide was added at 0° C. to a solution of 0.89 g. (3 mmoles) of Ibc-Pro-OH and 0.49 g. (3 mmoles) of 3-hydroxy-4-oxo-3,4-dihydro-1,2,3-benzotriazine in 10 cc. of dimethylformamide. After allowing the whole to stand for 1 hour at 0° C. and for 1 hour at room temperature, urea was removed by suction-filtration and the filtrate was combined with 1.12 g. (1,2 mmoles) of H-Lys(Ibc)-Ala-GlN-AsN-Pro-GlN-Ala-OH. The resulting suspension was diluted with 35 cc. of dimethylformamide and combined at 0° C. with 0.17 cc. (1.2 mmoles) of triethylamine. After stirring for 3 hours at room temperature, the clear solution that formed was evaporated under a highly reduced pressure. The oily residue crystallized upon trituration with ethyl acetate. The crystalline residue was dissolved in a mixture of methanol and water, and the solution was stirred with Dowex 50 and filtered. The filtrate was washed with methanol and evaporated under reduced pressure. The crude product was recrystallized from isopropanol.

Yield: 1.8 g. (79%); melting point: 194–197° C. (decomposition; $[\alpha]_D^{22}$: −68.8° (c.=1, in 90% acetic acid).

$C_{58}H_{92}N_{12}O_{16} \cdot 2H_2O$ (1249.4).—Calcd. (percent): C, 55.8; H, 7.8; N, 13.5. Found (percent): C, 55.9; H, 8.0; N, 13.4.

(d) H-Pro-Lys-Ala-GlN-AsN-Pro-
GlN-Ala-OH·2CF$_3$COOH 0.62 g. (0.5 mmole) of

Ibc-Pro-Lys(Ibc)Ala-GlN-AsN-Pro-GlN-Ala-OH·2H$_2$ was dissolved in 2 cc. of trifluoroacetic acid. After standing for 1 hour at room temperature, the solution was concentrated under reduced pressure to yield an oil which was then triturated with 50 cc. of absolute ether. After some standing, the precipitate formed was filtered off with suction and dried over KOH and P$_2$O$_5$ under a highly reduced pressure.

Yield: 0.53 g. (98%); R$_f$=0.11 (in pyridine/n-butanol/glacial acetic acid/water (20:30:6:24) thin-layer plate silica gel F, Merck)); $[\alpha]_D^{22}$: −71.5° (c.=1, in methanol).

EXAMPLE 16

Ibc-NH-(CH$_2$)$_5$-CO-Ala-GlN-AsN-Pro-GlN-Ala-OH 1.56 (5 mmoles) of Ibc-ε-aminocaproic acid and 0.82 g. (5 mmoles) of 3-hydroxy-4-oxo-3,4-dihydro-1,2,3-benzotriazine in 30 cc. of dimethylformamide were combined at 0° C. with 1.03 g. (5 mmoles) of dicyclohexylcarbodiimide. The whole was allowed to stand for 1 hour at 0° C. and for 1 hour at room temperature, the urea was removed by suction-filtration and filtrate was combined with a solution of 2.25 g. (3 mmoles) of H-Ala-GlN-AsN-Pro-GlN-Ala-OH·CF$_3$COOH (according to German patent application P 19 24 802.3), in 30 cc. of dimethylformamide. 0.83 cc. (6 mmoles) of triethylamine was added at 0° C. and the mixture was stirred for 2 hours at room temperature. After evaporation under a strongly reduced pressure, the residue was triturated with ethyl acetate. The crystallized product was filtered off with suction, dissolved in a mixture of methanol and water and then stirred for 30 minutes with Dowex 50. The ion exchanger was removed by filtration. The filtrate was washed with a mixture of methanol and water, then evaporated under reduced pressure. The residue was dried over P$_2$O$_5$ under a strongly reduced pressure. The crude product was recrystallized from isopropanol.

Yield: 1.98 g. (72%); melting point: 207–209° C. (decomposition); $[\alpha]_D^{22}$: +58.7° (c.=1, in 90% acetic acid).

$C_{42}H_{68}N_{10}O_{13}$ (921.1).—Calc. (percent): C, 54.7; H, 7.4; N, 15.2. Found (percent): C, 54.7; H, 7.5; N, 15.5.

EXAMPLE 17

(a) Ibc-Ser-Tyr-Ser-Met-Glut(OtBu)-
His-Phe-Arg-Try-Gly-OH

A solution of 0.57 g. (2 mmoles) of Ibc-Ser-OH and 0.36 g. (2.2 mmoles) of 3-hydroxy-4-oxo-3,4-dihydro-1,2,3-benzotriazine in 10 cc. of dimethylformamide was combined at 0° C. with 0.41 g. (2 mmoles) of dicyclohexyl-carbodiimide. The whole was allowed to stand for 1 hour at 0° C. and for 1 hour at room temperature, urea was removed by suction-filtration and the filtrate was washed with 5 cc. of dimethylformamide. The filtrate was combined with 1.34 g. (1 mmole) of H-Tyr-Ser-Met-Flu(OtBu)-His-Phe-Arg-Try-Gly-OH (Liebig's Ann. d. Chem., volume 726 (1969), page 177), 0.11 cc. (1 mmole) of N-methylmorpholine was added at 0° C. and the whole was stirred for 12 hours at room temperature. The mixture was evaporated under a highly reduced pressure, the residue was triturated with a mixture of ethyl acetate and ether and triturated with the mixtures of 20 cc. of dimethylformamide, 10 cc. of methanol and 20 cc. of ethyl acetate. The resulting product was then boiled with isopropanol.

Yield: 1.01 g. (66%); melting point: 238° C. (decomposition); $[\alpha]_D^{22}$: −13.1° (c.=1, in 90% acetic acid).

$C_{74}H_{101}N_{16}O_{18}S$ (1534.8).—Calcd. (percent): C, 57.9; H, 6.6; N, 14.6; S, 2.0. Found (percent): C, 57.6; H, 6.8; N, 14.9; S, 2.2.

(b) H-Ser-Try-Ser-Met-Glu-Gly-Phe-Arg-
Try-His-Lys-Pro-Val-Gly-Lys-Lys-Arg-
Arg-Pro-Val-Lys-Val-Tyr-NH$_2$-Acetate 085 g. of Ibc-decapetitide (0.55 mmole) obtained according to (a) and 12.5 g. (0.5 mmole) of H-Lys(Boc)-Pro-Val-Gly-Lys(Boc)-
Lys(Boc)-Arg-Arg-Pro-Val-Lys(Boc)-Val-
Tyr-NH$_2$-trihydrochloride or -tritosylate (Chem. Ber. 97 (1964), 1197) were dissolved in 15 cc. of pure dimethylacetamide. After addition of 270 mg. (2 mmoles) of 1-hydroxy-benzotriazole, ⅓ of a solution of 650 (mg. (about 3 mmoles) of dicyclohexyl-carbodiimide in 2 cc. of dimethylacetamide was added at room temperature. After half an hour, a further third, and after one hour the last third were added. The whole was stirred for 2–3 hours at room temperature and then the crude, still protected corticotropin-(1–23)-amide was precipitated with 150 cc. of ether. Yield: 2.0 g.

For splitting off the protective groups, the product was dissolved in 20 cc. of 90% trifluoroacetic acid, then, after standing for 1 hour at room temperature, precipitated with 150 cc. of ether. The reaction product was purified in known manner by chromatography on carboxymethyl cellulose by elution with aqueous ammonium acetate or acetic acid with rising molarity.

EXAMPLE 18

(a) Z-Arg(Ibc)$_2$-OH

A suspension of 30.83 g. (100 mmoles) of Z-Arg-OH in 40 cc. of dioxane and 20 cc. of water was at first combined with 50 cc. (240 mmoles) isobornyloxycarbonyl chloride and then while stirring at 0–5° C. and at a pH of 11–13 with a total of 100 cc. of 4 N-NaOH. After the addition of further 10 cc. of isobornyloxycarbonyl chloride, the whole was stirred for 3 hours at 0° C. The whole was then washed five times with petroleum ether, taken up in ether, the etheral phase was separated and shaken with an aqueous solution of citric acid, washed with water, dried over sodium sulfate and evaporated under reduced pressure. Crude yield: 67 g. (quantitative). The crude product was purified by column chromatography on silica gel (0.05–0.2 mm., Merck), using diethyl- or diisopropyl ether for the elution.

Yield: 44.0 g. (66%); decomposition at about 124° C.; $[\alpha]_D^{22}$: +10.8° (c.=1, in chloroform).

$C_{36}H_{52}N_4O_8$ (668.85).—Calc. (percent): C, 64.7; H, 7.8; N, 8.4. Found (percent): C, 64.9; H, 8.0; N, 8.2.

(b) Z-Arg(Ibc)$_2$-Gly-NH$_2$

A solution of 33.44 g. (50 mmoles) of Z-Arg(Ibc)$_2$-OH in 130 cc. of dimethylformamide was combined with 8.3 g. (75 mmoles) of H-Gly-NH$_2$·HCl, 13.5 g. (100 mmoles) of 1-hydroxybenzotriazole and at 0° C. with 8.25 cc. (75 mmoles) of N-methylmorpholine and 10.3 g. (50 mmoles) of dicyclohexylcarbodiimide. The whole was stirred for 1 hour at 0° C. and for 2½ hours at room temperature, dicyclohexyl-urea was removed by suction-filtration and the filtrate was evaporated under a highly reduced pressure. The residue was dissolved in ethyl acetate. The solution was extracted with an aqueous sodium bicarbonate solution, dilute citric acid and water, dried over sodium sulfate and evaporated under reduced pressure.

Crude yield: 36.7 g. (quantitative). The crude product was dissolved in a small amount of methanol, introduced into a column filled with silica gel (0.05–0.2 mm., Merck) and the desired substance was eluted at first with ether, then with a mixture of ether and methanol.

Yield: 19.0 g. (54%); $R_f$: 0.65, in ether/methanol (9:0.5) (thin-layer plate silica gel F, Merck); $[\alpha]_D^{22}$: +8.4° (c.=1, in chloroform).

(c) Z-Pro-Arg(Ibc)$_2$-Gly-NH$_2$ ($\alpha$) 12.9 g. (16.7 mmoles) of Z-Arg(Ibc)$_2$-Gly-NH$_2$ were hydrogenated for 6 hours in 60 cc. of methanol in the presence of palladium/barium sulfate. The whole was suction-filtered, the filtrate was evaporated under reduced pressure and the residue was dried under a highly reduced pressure over phosphorus pentoxide. Yield: 9.86 g. (quantitative) of H-Arg(Ibc)$_2$-Gly-NH$_2$.

($\beta$) A solution of 9.85 g. (16.7 mmoles) of H-Arg-(Ibc)$_2$-Gly-NH$_2$ in 30 cc. of dimethylformamide was combined with 6.40 g. (18.5 mmoles) of Z-Pro-OSu (J. Amer. Chem. Soc., volume 86 (1964), page 1839). The whole was stirred for 12 hours at room temperature and, after following filtration, it was evaporated under a highly reduced pressure. The residue was dissolved in ethyl acetate. The ethyl acetate solution was washed with an aqueous sodium bicarbonate solution, dilute citric acid and water, dried over sodium sulfate and evaporated under reduced pressure. The residue was dried under a highly reduced pressure over phosphorus pentoxide.

Crude yield: 13.7 g. (quantitative). The product could be purified by column chromatography on silica gel (0.05–0.2 mm., Merck); elution was effected with ether/methanol (9:1) (thin-layer plate silica gel F, Merck).

(d) H-Pro-Arg(Ibc)$_2$-Gly-NH$_2$·H$_2$O 8.78 g. (10.7 mmoles) of Z-Pro-Arg(Ibc)$_2$-Gly-NH$_2$ were hydrogenated for 1½ hours in 100 cc. of methanol in the presence of palladium/barium sufate catalyst. After removal of the catalyst, the whole was evaporated under reduced pressure and dried under a highly reduced pressure.

Yield: 7.55 g. (quantitative). The product was found to be chromatographically almost pure; a completely pure product was obtained by column chromatography on silica gel, while effecting elution with ether/methanol (8:2).

Yield: 6.28 g. (83%); $[\alpha]_D^{22}$: −6.2° (c.=1, in chloroform).

$C_{35}H_{57}N_7O_7·H_2O$ (705.9).—Calc. (percent): C, 59.5; H, 8.1; N, 13.9. Found (percent): C, 59.2; H, 8.1; N, 13.6.

(e) Z-Ala-Pro-Arg(Ibc)$_2$-Gly-NH$_2$

A solution of 7.55 g. (10.7 mmoles) of H-Pro-Arg-(Ibc)$_2$-Gly-NH$_2$·H$_2$O in 100 cc. of dimethylformamide was combined with 3.43 g. (10.7 mmoles) of Z-Ala-OSu (J. Amer. Chem. Soc., volume 86 (1964), page 1839) and stirred for 18 hours at room temperature. The whole was then evaporated under a highly reduced pressure. The residue was dissolved in ethyl acetate. The ethyl acetate solution was washed with a sodium bicarbonate solution, dilute citric acid and water, dried over sodium sulfate and evaporated under reduced pressure.

Yield: 9.00 g. (94%); $[\alpha]_D^{22}$: −54.5° (c.=1, in chloroform).

$C_{46}H_{68}N_8O_{10}$ (893.1).—Calc. (percent): C, 61.9; H, 7.7; N, 12.5. Found (percent): C, 62.0; H, 7.8; N, 12.2.

(f) Z-AsN-Ala-Pro-Arg(Ibc)$_2$-Gly-NH$_2$ ($\alpha$) 8.93 g. (10 mmoles) of Z-Ala-Pro-Arg(Ibc)$_2$-Gly-NH$_2$ were hydrogenated for 2 hours in 100 cc. of methanol in the presenue of palladium/barium sulfate catalyst. The filtered solution was evaporated under reduced pressure and the residue was dried under a highly reduced pressure. Yield: 7.27 g. (96%) of H-Ala-Pro-Arg(Ibc)$_2$-Gly-NH$_2$.

($\beta$) A solution of 7.27 g. (9.6 mmoles) of H-Ala-Pro-Arg(Ibc)$_2$-Gly-NH$_2$ and 3.7 g. (9.6 mmoles) of Z-AsN-ONp in 40 cc. of dimethylformamide was stirred for 12 hours at room temperature and then combined with ether. After trituration, the precipitate was separated by suction-filtration, washed with ether and dried under a highly reduced pressure. It was finally boiled with methanol.

Yield: 7.14 g. (74%); melting point: 211–212° C. (decomposition); $R_f$=0.74 (in chloroform/methanol (8:3) (thin-layer plate silica gel F, Merck).

(g) Z-Tyr(tBu)-Phe-GlN(Mbh)-AsN-Ala-Pro-Arg(Ibc)$_2$-Gly-NH$_2$ ($\alpha$) H-AsN-Ala-Pro-Arg(Ibc)$_2$-Gly-NH$_2$·CH$_3$COOH was obtained by catalytic hydrogenation of 8.06 g. (8 mmoles) of Z-AsN-Ala-Pro-Arg(Ibc)$_2$-Gly-NH$_2$ in acetic acid. Yield: 7.28 g. (97.5%).

($\beta$) A solution of 8.3 g. (9.4 mmoles) of Z-Tyr(tBu)-Phe-GlN(Mbh)-OH (Chem. Ber. volume 103 (1970), page 2041) and 1.54 g. (9.4 mmoles) of 3-hydroxy-4-oxo-3,4-dihydro-1,2,3-benzotriazine in 55 cc. of dimethylformamide was combined at 0° C. with 1.94 g. (9.4 mmoles) of dicyclohexyl-carbodiimide. The whole was stirred for 1 hour at 0° C. and for 1 hour at 25° C., dicyclohexyl-urea that had precipitated was removed by filtration and washing was carried out with 25 cc. of dimethylformamide. The filtrate was combined with 7.28 g. (7.8 mmoles) of H-AsN-Ala-Pro-Arg(Ibc)$_2$-Gly-NH$_2$·CH$_3$-COOH and at 0° C. with 1 cc. (7.8 mmoles) of N-ethylmorpholine. The whole was stirred for 3 hours at room temperature, then filtered. The filtrate was combined with water. The precipitate was filtered off with suction and dried and then boiled with methanol.

Yield: 9.8 g. (73%); melting point: 240–245° C. (decomposition).

(h) Boc-$\beta$-Ala-Tyr(tBu)-Phe-GlN(Mbh)-AsN-Ala-Pro-Arg(Ibc)$_2$-Gly-NH$_2$ ($\alpha$) 1.50 g. (0.87 mmole) of Z-Tyr(tBu)-Phe-GlN-(Mbh)-AsN-Ala-Pro-Arg(Ibc)$_2$-Gly-NH$_2$ were dissolved in 60 cc. of 90% acetic acid and hydrogenated for 2 hours in the presence of a palladium/barium sulfate catalyst. After removal of the catalyst, the filtrate was evaporated and the residue was triturated with water. After centrifugation, the product was dried under a highly reduced pressure over phosphorus pentoxide. Yield: 0.97 g. (70%) of H-Tyr(tBu)-Phe-GlN(Mbh)-AsN-Ala-Pro-Arg(Ibc)$_2$-Gly-NH$_2$. Melting point: 185–186° C. (decomposition).

($\beta$) 0.34 g. (0.92 mmole) of Boc-$\beta$-Ala-OTcp were introduced into a solution of 0.97 g. (0.61 mmole) of H-Tyr(tBu) - Phe-GlN(Mbh)-AsN-Ala-Pro-Arg(Ibc)$_2$-Gly-NH$_2$ in 10 cc. of dimethylformamide. The whole was allowed to stand for 24 hours at room temperature, then concentrated under a highly reduced pressure. The residue was triturated in ethyl acetate. After suction-filtration and drying, the nona-peptide was boiled with methanol.

Yield: 0.78 g. (73%); decomposition: from 253–254° C. onwards.

(i) H-$\beta$-Ala-Tyr-Phe-GlN-AsN-Ala-Pro-Arg-Gly-NH$_2$·2HCl 0.30 g. (0.17 mmole) of Boc-$\beta$-Ala-Tyr(tBu)-Phe-GlN-(Mbh)-AsN-Ala-Pro-Arg(Ibc)$_2$-Gly-NH$_2$ was dissolved in 1 cc. of a mixture of trifluoroacetic acid and HCl (9:1). The whole was allowed to stand for 2 hours at room temperature, then concentrated under reduced pressure to yield an oil which was triturated with absolute ether, decanted and treated twice with absolute ether.

Yield: 0.23 g.; decomposition: at 156–158° C.

Amino-acid analysis.—Calc. (percent): Phe, 1.0; Ala, 1.0; Gly, 1.0; Asp, 1.0; Arg, 1.0; NH$_3$, 3.0. Found (percent): Phe, 1.00; Ala, 1.00; Gly, 0.98; Asp, 1.01; Arg, 0.98; NH$_3$, 3.08.

EXAMPLE 19

Z-Arg(Ibc)$_2$-Pro-Val-Lys(Boc)-Val-Tyr-NH$_2$ 8.03 g. (12 mmoles) of Z-Arg(Ibc)$_2$-OH, 7.04 g. (10 mmoles) of H-Pro-Val-Lys(Boc)-Val-Tyr-NH$_2$ (G.P. P 19 24 802.3) and 3.24 g. (24 mmoles) of 1-hydroxybenzotriazole were dissolved in 250 cc. of dimethylformamide and combined at 0° C. with 2.47 g. (12 mmoles) of dicyclohexyl-carbodiimide. The whole was then stirred for 1 hour at 0° C. and for 6 hours at room temperature. After cooling to −5° C., dicyclohexyl-urea was removed by filtration with suction and the filtrate was combined with an aqueous sodium bicarbonate solution. The crystalline precipitate was filtered off with suction, washed with water, dried under highly reduced pressure over phosphorus pentoxide and recrystallized from methanol.

Yield: 8.29 g. (61%); melting point: 215–216° C. (decomposition).

$C_{71}H_{107}N_{11}O_{15}$ (1354.7).—Calc. (percent): C, 62.9; H, 8.0; N, 11.4. Found (percent): C, 62.7; H, 8.0; N, 11.6.

EXAMPLE 20

(a) H-Arg(Ibc)$_2$-OH 15.0 g. (22.42 mmoles) of Z-Arg(Ibc)$_2$-OH were dissolved in 90 cc. of methanol and hydrogenated for 2–3 hours in the presence of a palladium/barium sulfate catalyst. After removal of the catalyst, the whole was evaporated under reduced pressure and the residue was triturated with a mixture of ether and petroleum ether.

Yield: 8.8 g. (73%); melting point: 135–137° C. (decomposition); $R_f$=0.43 in chloroform/methanol (8:3) (thin-layer plate silica gel F, Merck).

(b) Z-Lys(Boc)-Arg(Ibc)$_2$-OH 4.78 g. (10 mmoles) of Z-Lys(Boc)-OSU (Bull. Chem. Soc. Japan, volume 39 (1966) page 885) and 5.35 g. (10 mmoles) of H-Arg(Ibc)$_2$-OH were combined at 0° C. in 100 cc. of dimethylformamide with 1.38 cc. (10 mmoles) of triethylamine. The solution was stirred for 4 hours at room temperature and then evaporated in a high vacuum. The oily residue was dissolved in methanol and the product was precipitated in the form of a greasy mass by means of an aqueous solution of citric acid. After centrifugation, the greasy mass was triturated in a mortar with water, filtered off with suction, washed with water and dried under a highly reduced pressure over phosphorus pentoxide.

Yield: 8.00 g. (90%); decomposition: at 105–110° C.; $[\alpha]_D^{22}$: +6.8° (c.=1, in chloroform); $R_f$=0.74 in chloroform/methanol (8:3) (thin-layer plate silica gel F, Merck).

$C_{47}H_{72}N_6O_{11}$ (897.1).—Calc. (percent): C, 62.9; H, 8.1; N, 9.4. Found (percent): C, 62.6; H, 8.0; N, 9.7.

(c) Z-Lys(Boc)-Arg(Ibc)$_2$-Arg(Ibc)$_2$-OH (α) A solution of 7.18 g. (8 mmoles) of Z-Lys(Boc)-Arg(Ibc)$_2$-OH and 1.04 g. of N-hydroxy-succinimide (9 mmoles) in 35 cc. of ethyl acetate was combined at 0° C. with 1.65 g. (8 mmoles) of dicyclohexyl-carbodiimide. The whole was allowed to stand for 16 hours at 0° C., dicyclohexyl-urea was removed by filtration with suction and the filtrate was evaporated under reduced pressure.

(β) The dried residue (8.57 g.) and 4.28 g. (8 mmoles) of H-Arg(Ibc)$_2$-OH were combined in 25 cc. of dimethylformamide at 0° C. with 1.11 cc. (8 mmoles) of triethylamine. The whole was stirred for 3 hours and the solution was then evaporated under a strongly reduced pressure. The oily residue was triturated with a dilute aqueous solution of citric acid. The product was filtered off with suction, washed with water and dried under a strongly reduced pressure over phosphorus pentoxide.

Yield: 11.44 g. (quantitative); melting point: 113–115° C. (decomposition).

$C_{75}H_{116}N_{10}O_{16}\cdot H_2O$ (1431.8).—Calc. (percent): C, 62.8; H, 8.3; N, 9.8. Found (percent): C, 62.8; H, 8.3; N, 9.9.

EXAMPLE 21

(a) Ibc-OSu 8.2 cc. (100 mmoles) of pyridine in 65 cc. of dioxane were added dropwise, at 0° C., while stirring, to a solution of 21.67 g. (100 mmoles) of isobornyloxy-carbonyl chloride and 15.0 g. (130 mmoles) of N-hydroxysuccinimide in 100 cc. of dioxane. The whole was then stirred for 20 hours at room temperature, filtered, and washed with a little dioxane. The filtrate was evaporated under reduced pressure. The oily residue was crystallized from a mixture of methanol and water.

Yield: 23.9 g. (81%); melting point: 95–97° C.

$C_{15}H_{21}NO_5$ (295.3).—Calc. (percent): C, 61.0; H, 7.2; N, 4.8. Found (percent): C, 60.9; H, 7.1; N, 5.1.

(b) Ibc-Arg(Ibc)$_2$-OH 5.35 g. (10 mmoles) of H-Arg(Ibc)$_2$-OH and 2.96 g. (10 mmoles) of Ibc-OSu were combined in 50 cc. of dimethylformamide at 0° C. with 1.38 cc. (10 mmoles) of triethylamine. The whole was stirred for 4 hours at room temperature, then evaporated under reduced pressure. The residue was dissolved in methanol and a dilute aqueous solution of citric acid was added. After decantation, the resin was triturated with water until crystallization. The crystals were filtered off with suction, washed with water and dried under a strongly reduced pressure over phosphorus pentoxide.

Yield: 5.78 g. (81%); decomposition at about 110° C.

$C_{39}H_{62}N_4O_8$ (715.0).—Calc. (percent): C, 65.5; H, 8.7; N, 7.8. Found (percent): C, 65.3; H, 8.7; N, 7.7.

PREPARATION OF THE STARTING SUBSTANCES (a) Isobornyloxycarbonyl chloride

A solution of 28 g. (181.5 mmoles) of D,L-, D- or L-isoborneol and 25 cc. of pyridine in 44 cc. of anhydrous benzene was added dropwise, at −5° to +5° C., while stirring, to a solution of 100 g. of phosgene in 350 cc. of anhydrous benzene. The whole was stirred for 1 hour at 20° C., then suction-filtered. The filter residue was washed thoroughly with benzene and the filtrate was washed twice with ice-cold water, dried over sodium sulfate and evaporated under reduced pressure. After combination with a small amount of petroleum ether, the oily residue was evaporated again under reduced pressure and dried for a short time under a strongly reduced pressure.

Yield: 39.4 g. of oil (quantitative). The oil was found to boil at 77°–78° C./0.4–0.45 torr.

The Ibc-, D-Ibc- and L-Ibc-chlorides showed identical infrared spectra.

Optical rotation: $[\alpha]_D^{20}$: (c.=1, in chloroform):

D-Ibc-chloride _____ −56.6°
L-Ibc-chloride _____ +54.3°

$C_{11}H_{17}ClO_2$ (216.7).—Calc. (percent): Cl, 16.36. Found (percent): Cl, 16.2.

(b) Isobornyloxycarbonyl amino-acids

4 N-sodium hydroxide solution was added dropwise, while stirring, at 20–25° C. to 25 mmoles of amino-acid and 6.25 cc. (30 mmoles) of isobornyloxycarbonyl chloride in 5 cc. of water and 5 cc. of dioxane, while keeping the pH-value of the reaction mixture at the beginning at 8 to 10, preferably 10. After induction of the acylation, the pH-value decreased rapidly with evolution of heat. The reaction was continued, with further dropwise addition of 4 N-sodium hydroxide solution, either at pH 10 or, preferably, at a lower pH-value (7 to 9) and a lower temperature (0° to 10° C.), a total of about 12.5 to 13.5 cc. of 4 N-sodium hydroxide solution being consumed, until a constant pH-value was reached. If a sodium salt of the corresponding Ibc-amino-acid had been formed, which salt is insoluble in ether, excess isobornyloxy-carbonyl chloride was removed by washing with ether. After acidification with dilute citric acid to pH 2 to 3, the Ibc-amino-acid set free was dissolved in ethyl acetate. The ethyl acetate solution was washed twice with water, dried over sodium sulfate and evaporated under reduced pressure. The residue was triturated with petroleum ether. The dicyclohexyl-amine salts of the corresponding Ibc-amino-acids may be obtained by dissolving in ether or petroleum ether and adding of dicyclohexylamine.

The Ibc-amino-acids prepared according to this standard method are listed in the following table. They have been tested for their purity by thin-layer chromatography (silica gel F, Merck; chloroform/methanol (8:3) and butanol/glacial acetic acid/water (3:1:1)).

| Compound | Starting product | Yield (percent) | $[\alpha]_D^{20}$ (c.=1 in $CHCl_3$), degrees | Melting point, degrees |
|---|---|---|---|---|
| Ibc-Gly-OH | H-Gly-OH | 100 | | 182–187 |
| Ibc-Ala-OH | H-Ala-OH | 100 | [1] –30.3 | 114–11 |
| Ibc-Leu-OH | H-Leu-OH | 100 | –7.8 | |
| Ibc-Phe-OH | H-Phe-OH | 100 | +45.4 | 78–80 |
| Ibc-GlN-OH | H-GlN-OH | 100 | +14.5 | ~83 |
| Ibc-Tyr(Bz)-OH | H-Tyr(Bz)-OH | 95 | +41.7 | |
| Ibc-Ser-OH | H-Ser-OH | 96 | +12.5 | 58–61 |
| Ibc-Cys(Bz)-OH | H-Cys(Bz)-OH | 90 | –3.7 | |
| Ibc-D,L-Try-OH | H-D,L-Try-OH | 92 | | 188–189 |
| Ibc-His(Ibc)-OH | H-His-OH | 100 | +43.3 | 100–105 |
| Ibc-Glu(OtBu)-OH | H-Glu(OtBu)-OH | 99 | +7.0 | |
| Ibc-Pro-OH | H-Pro-OH | 100 | –65.7 | 141–142 |
| Ibc-N-methyl-β-Ala-OH | H-N-methyl-β-Ala-OH | [2] 76 | | [2] 114–116 |
| Ibc-γ-Abu-OH | H-γ-Abu-OH | 95 | | [2] 110–110.5 |
| Ibc-ε-amino-caproic acid | ε-Amino-caproic acid | 98 | | [2] 89 |
| D-Ibc-Val-OH | H-Val-OH | 99 | –32.6 | 134–136 |
| D-Ibc-GlN-OH | H-GlN-OH | 98 | –24.3 | ~66 |
| D-Ibc-Met-OH | H-Met-OH | 95 | –22.6 | |
| D-Ibc-Ser-OH | H-Ser-OH | 95 | –29.3 | 55–60 |
| D-Ibc-Try-OH | H-Try-OH | 92 | –9.1 | 179 |
| Z-Lys(D-Ibc)-OH | Z-Lys-OH | 100 | –10.9 | |
| L-Ibc-Val-OH | H-Val-OH | 100 | +31.4 | |
| L-Ibc-Phe-OH | H-Phe-OH | 100 | +31.3 | ~70 |
| L-Ibc-Try-OH | H-Try-OH | 91 | +41.4 | ~165 |

[1] C.=1 in methanol.
[2] Dicyclohexylamino salt.

(c) Ibc-OSu 8.2 cc. (100 mmoles) of pyridine in 65 cc. of dioxane were added dropwise, at 0° C., while stirring, to a solution of 21.67 g. (100 mmoles) of D,L-isobornyloxycarbonyl chloride and 15.0 g. (130 mmoles) of N-hydroxysuccinimide in 100 cc. of dioxane. The whole was stirred for 5 hours and then allowed to stand for 12 hours at room temperature, filtered with suction, and washed with a small amount of dioxane. The filtrate was evaporated under reduced pressure. The oily residue was crystallized from a mixture of methanol and water.

Yield: 23.78 g. (81%); melting point: 95–97° C.

We claim:

1. The method of making an N-isobornyloxycarbonyl derivative of a naturally-occurring or synthetic α- or ω-amino or -imino acid, in its D-, L-, or racemic form, or of a peptide built up from these amino or imino acids, said amino or imino acid or peptide having at least one free amino group, which comprises reacting said amino or imino acid or peptide with isobornyloxycarbonyl chloride at a pH between 6 and 14 in the presence of an acid-binding agent.

2. The method of making an N-isobornyloxycarbonyl derivative of a naturally-occurring or synthetic α- or ω-amino or -imino acid, in its D-, L-, or racemic form, or of a peptide built up from these amino or imino acids, said amino or imino acid or peptide having at least one free amino group, which comprises reacting said amino or imino acid or peptide with an active isobornyloxycarbonyl ester.

3. In the method of synthesizing a peptide which comprises reacting
(A) a first reagent which is
 (1) a naturally-occurring or synthetic α- or ω-amino or -imino acid, in its D-, L-, or racemic form, or
 (2) a peptide built up from these amino and imino acids, said first reagent having a free carboxy group, all other functional groups thereof which require protection being protected, with
(B) a second reagent which is
 (1) a naturally-occurring or synthetic α- or ω-amino or -imino acid, in its D-, L-, or racemic form, or
 (2) a peptide built up from these amino and imino acids, said second reagent having a free amino group, all other functional groups thereof which require protection being protected, the improvement wherein said first reagent is an N-isobornyloxycarbonyl-amino or -imino acid or is an N-isobornyloxycarbonyl-peptide.

4. In the method of synthesizing a peptide which comprises reacting
(A) a first reagent which is
 (1) a naturally-occurring or synthetic α- or ω-amino or -imino acid, in its D-, L-, or racemic form, or
 (2) a peptide built up from these amino and imino acids said first reagent having a free carboxy group, all other functional groups thereof which require protection being protected, with
(B) a second reagent which is
 (1) a naturally-occurring or synthetic α- or ω-amino or -imino acid, in its D-, L-, or racemic form, or
 (2) a peptide built up from these amino and imino acids, said second reagent having a free amino group, all other functional groups thereof which require protection being protected, the improvement wherein said second reagent is $N^G$-di-isobornyloxycarbonyl-arginine or a peptide containing $N^G$-di-isobornyloxycarbonyl-arginine.

No references cited.

ELBERT L. ROBERTS, Primary Examiner